Figure 1:
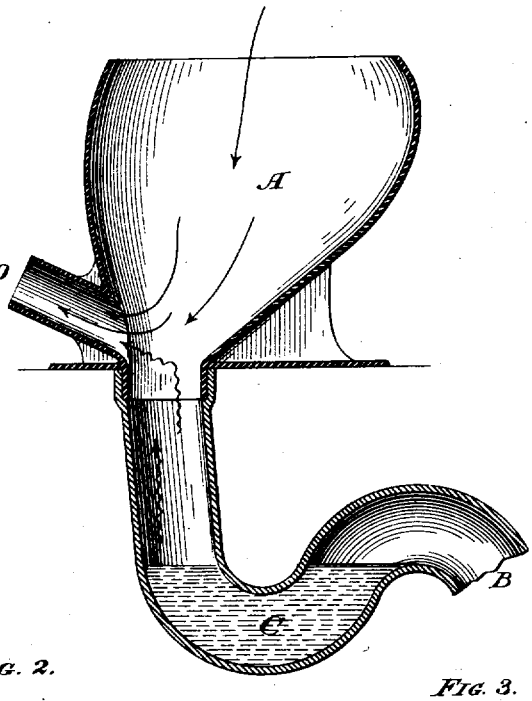

R. D. O. SMITH.

Water Closet.

No. 9,426. Reissued Oct. 19, 1880.

*Attest:*

Aug. Jordan

R. T. Barnes.

*Inventor:*

R. D. O. Smith

UNITED STATES PATENT OFFICE.

ROBERT D. O. SMITH, OF WASHINGTON, DISTRICT OF COLUMBIA.

WATER-CLOSET.

SPECIFICATION forming part of Reissued Letters Patent No. 9,426, dated October 19, 1880.

Original No. 136,105, dated February 18, 1873. Application for reissue filed September 14, 1880.

DIVISION B.

*To all whom it may concern:*

Be it known that I, ROBERT D. O. SMITH, of Washington, in the District of Columbia, have invented a new and useful Improvement in Water-Closets; and I do hereby declare that the following is a full and complete description of that part of my invention which is included and claimed in this patent.

Heretofore apartments have been ventilated by means of shafts or flues connected therewith, through which an upward flow of air has been produced by means of heat, fans, and other artificial appliances when the required current would not be produced by natural causes; and I am aware that the ventilation of sewers has been attempted in a similar way.

I am also aware that a water-closet has been provided with a lateral outlet connecting with a pipe, which is extended from the cesspool or sewer to the outer atmosphere for the alleged purpose of ventilating both the cesspool and the water-closet.

The escape of sewer-gas and other foul odors from the soil or waste pipe is generally caused by gaseous pressure within said pipes in excess of the external atmospheric pressure. This excessive pressure is due to chemical and mechanical causes which are well understood.

All fluids move in lines of least resistance, and it is evident that a gas moving through a pipe and under pressure greater than atmospheric pressure will seek to escape through any lateral opening. Under such circumstances, and a water-closet having a lateral ventilating connection with a pipe also in communication with the cesspool or sewer, sewer-gas will be driven through said ventilating-pipe into the hopper, and thence into the apartment, from which no system of ventilation employed prior to my invention has been effectual to remove it. Therefore I do not claim anything as to the principles involved, but only as to the special application of those principles to accomplish the ventilation of hopper-closets in the particular manner herein set forth and claimed.

The object of my invention is accomplished by causing a flow of pure air inward and downward through the closet, &c., thence into a duct or flue, which will discharge the same and any gases or odors which it may have encountered on its passages through the closet into the air outside the apartment or building, and so high in the atmosphere as to render them innoxious.

The flue or duct and the closet, with the intermediate connection, constitute an inverted siphon, of which the closet is a part of the shorter leg, subject to the same law of action which controls the flow of fluids through siphons. As in other siphons, the effective action will bear a proportion to the diversity of length of the two legs modified by any imported force, such as is produced by heat, fans, &c., and it is evident that if the longer leg be extended below its connection with the shorter leg to another opening it will no longer constitute a siphon.

Having now indicated the principles of action of my invention, that part of the same which is included in this patent consists in an open hopper-closet with a plain lateral outlet to establish connection with a flue or other duct, whereby the outward flow of air through said flue, which constitutes the longer leg of the siphon, will cause a corresponding flow of air inward through said hopper, which constitutes the shorter leg, as indicated by the arrows.

That others may more fully understand that part of my invention which is included in this patent, I will particularly describe it, having reference to the accompanying drawings, wherein—

Figure 2:
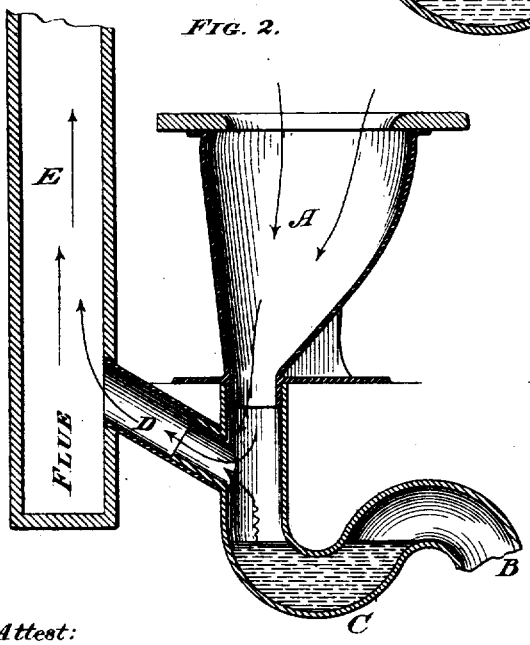
Figure 3:
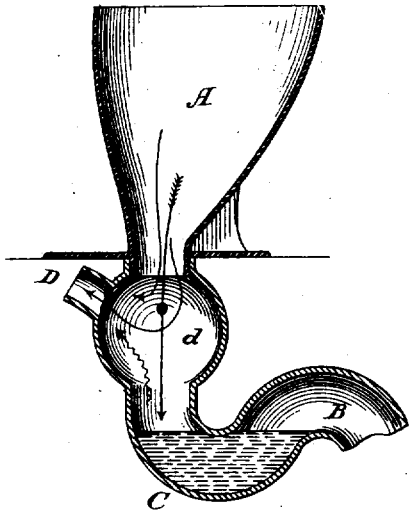

Figure 1 is a vertical central section of a hopper having the ventilating outlet or neck attached and integral with the hopper. Figs. 2 and 3 are central vertical sections of hoppers, showing said ventilating-outlet attached, but separable from the hopper.

A represents the hopper, say, of a water-closet. B is the soil-pipe to carry away the matters deposited therein, and C is an ordinary stench-trap.

D is the ventilating outlet or neck for connection with the flue or duct E in any convenient part of the building. The pipe D is inclined upward, so that water will not rest therein. For closets within dwellings the kitchen smoke-flue, or a flue contiguous thereto, will be the most desirable for this purpose, as such flue will be warmed daily, and will at all times possess an upward flow of air. Generally any long vertical flue will, if air may enter it at the bottom, as through one of my closets, insure a sufficiently strong draft. If natural causes prove to be insufficient, there are many ways of inducing a draft by mechanical means. These means, such as fans, furnaces, water-flow, as in the "tromp," &c., are well known, and do not require description here.

It may be necessary for the production of the best results, under some circumstances, to enlarge the pipe around the outlet D, as at *d*, (shown in Fig. 3,) to allow a slight variation in velocity at that point.

In Fig. 3 the arrow with the black disk at its middle represents the flow of water. Other arrows indicate air-currents.

It is intended to reserve from this patent all matter covered, or which might be covered, by reissue of the original patent of which this is a division except that part which is specifically shown in the drawings hereto attached.

I do not claim herein the general method of ventilating water-closets, that being the subject of a claim in another patent of even date herewith—a division of the same original patent.

Having described my invention, what I claim herein as new is—

1. A hopper, A, connected with and discharging into a soil-pipe, B, and combined with a lateral ventilating-outlet, D, and a flue or duct independent of the soil-pipe, whereby said hopper is constituted part of an inverted siphon for a ventilating current of air, as set forth.

2. A hopper, A, having an opening at its bottom adapted to discharge into a soil or waste pipe, and a lateral opening, D, adapted to be connected with a ventilating duct or flue, as set forth.

3. A hopper, A, having an opening at its bottom adapted to discharge into a soil-pipe, and provided with a lateral pipe or neck, D, inclined upward and adapted to be connected with a ventilating flue or duct, as set forth.

R. D. O. SMITH.

Witnesses:

M. V. SMITH,

L. H. MARSHALL.